US012784963B2

(12) United States Patent
Kashiwai et al.

(10) Patent No.: US 12,784,963 B2
(45) Date of Patent: Nov. 3, 2026

(54) MULTILAYER COIL COMPONENT

(71) Applicant: Murata Manufacturing Co., Ltd., Kyoto-fu (JP)

(72) Inventors: Yusuke Kashiwai, Nagaokakyo (JP); Kosei Otsuka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 832 days.

(21) Appl. No.: 18/301,763

(22) Filed: Apr. 17, 2023

(65) Prior Publication Data

US 2023/0253142 A1 Aug. 10, 2023

Related U.S. Application Data

(63) Continuation of application No. PCT/JP2021/038011, filed on Oct. 14, 2021.

(30) Foreign Application Priority Data

Oct. 20, 2020 (JP) ................................ 2020-176129

(51) Int. Cl.
*H01F 27/28* (2006.01)
*H01F 27/32* (2006.01)
(Continued)

(52) U.S. Cl.
CPC ....... *H01F 27/2804* (2013.01); *H01F 27/323* (2013.01); *H01F 2027/2809* (2013.01); *H01F 41/041* (2013.01); *H01F 41/122* (2013.01)

(58) Field of Classification Search
CPC .. H01F 27/2804; H01F 27/2828; H01F 27/29; H01F 27/24; H01F 27/30;
(Continued)

(56) References Cited

U.S. PATENT DOCUMENTS

2010/0127812 A1* 5/2010 Maeda ...................... H01F 3/08 336/200
2010/0253464 A1* 10/2010 Miyoshi ............. H01F 17/0013 336/200

(Continued)

FOREIGN PATENT DOCUMENTS

CN 101859628 A 10/2010
CN 104347239 A 2/2015

(Continued)

OTHER PUBLICATIONS

International Search Report issued in PCT/JP2021/038011; mailed Nov. 22, 2021.

*Primary Examiner* — Shawki S Ismail
*Assistant Examiner* — Kazi S Hossain
(74) *Attorney, Agent, or Firm* — Studebaker Brackett PLLC

(57) ABSTRACT

A multilayer coil component includes a multilayer body that is formed by laminating a plurality of insulation layers and that includes a coil inside thereof and outer electrodes provided on an outer surface of the multilayer body and electrically connected to the coil. The coil is formed by connecting a plurality of coil conductors, laminated together with insulation layers, via a connection conductor. At a connection portion at which the first coil conductor and the second coil conductor, being coil conductors adjacent to each other, are connected via the connection conductor, a conductor width of the connection conductor is smaller than a conductor width of the first coil conductor and a conductor width of the second coil conductor is smaller than the conductor width of the first coil conductor.

20 Claims, 3 Drawing Sheets

(51) Int. Cl.
*H01F 41/04* (2006.01)
*H01F 41/12* (2006.01)

(58) Field of Classification Search
CPC . H01F 17/04; H01F 27/06; H01F 3/14; H01F 17/045; H01F 27/263; H01F 27/292
USPC ................................. 336/200, 232, 192, 198
See application file for complete search history.

(56) References Cited

U.S. PATENT DOCUMENTS

| | | | | |
|---|---|---|---|---|
| 2016/0042862 | A1* | 2/2016 | Tachibana | H01F 17/0013 336/200 |
| 2019/0304656 | A1* | 10/2019 | Hirukawa | H01F 27/2804 |
| 2019/0348212 | A1* | 11/2019 | Tozawa | H01F 27/29 |

FOREIGN PATENT DOCUMENTS

| | | | |
|---|---|---|---|
| JP | H11-297531 | A | 10/1999 |
| JP | 2001-135548 | A | 5/2001 |
| JP | 2002208515 | A | 7/2002 |
| JP | 2003-109821 | A | 4/2003 |
| JP | 2009-044030 | A | 2/2009 |
| JP | 2011-40612 | A | 2/2011 |
| JP | 2017-028143 | A | 2/2017 |
| JP | 2019-009211 | A | 1/2019 |
| JP | 2019-047015 | A | 3/2019 |
| WO | 2013/108862 | A1 | 7/2013 |
| WO | 2014/181755 | A1 | 11/2014 |

* cited by examiner

MULTILAYER COIL COMPONENT

CROSS-REFERENCE TO RELATED APPLICATIONS

This application claims benefit of priority to International Patent Application No. PCT/JP2021/038011, filed Oct. 14, 2021, and to Japanese Patent Application No. 2020-176129, filed Oct. 20, 2020, the entire contents of each are incorporated herein by reference.

BACKGROUND

Technical Field

The present disclosure relates to a multilayer coil component.

Background Art

Japanese Unexamined Patent Application Publication No. 2017-28143 discloses a multilayer coil component including a coil inside an insulative element body having a multilayer structure, in which coil portions adjacent to each other are connected by a layered connection portion. The connection portion is disposed at a position corresponding to a position of a dividing portion of the coil portions, and has a rectangular shape extending along the shape of the dividing portion.

Further, Japanese Unexamined Patent Application Publication No. 2017-28143 discloses a structure in which an upper coil layer and a lower coil layer of a connection portion have different thicknesses in a lamination direction. Japanese Unexamined Patent Application Publication No. 2017-28143 describes that it is possible to provide a multilayer coil component with a reduced number of types of coil portions constituting a coil.

SUMMARY

A connection portion in a multilayer coil component is made of a conductor containing a metal such as silver, and an insulation layer made of an insulative material such as ferrite is present in the periphery of the connection portion. In the structure above, thermal stress, caused by a difference in coefficients of linear expansion between the conductor and the insulative material, is concentrated in the connection portion during heat treatment in a step of processing the multilayer coil component, particularly in a temperature decreasing process in which temperature varies from high to low. Specifically, tensile stress is generated in the insulation layer when the conductor contracts. When the tensile stress becomes larger than the strength of the insulation layer, a crack may occur in the insulation layer in the periphery of the connection portion.

Accordingly, the present disclosure provides a multilayer coil component in which a crack is less likely to occur in the periphery of a connection conductor that connects coil conductors.

A multilayer coil component of the present disclosure includes a multilayer body that is formed by laminating a plurality of insulation layers and that includes a coil inside thereof, and an outer electrode provided on an outer surface of the multilayer body and electrically connected to the coil. The coil is formed by connecting a plurality of coil conductors, laminated together with the insulation layers, via a connection conductor. At a connection portion at which a first coil conductor and a second coil conductor, being coil conductors adjacent to each other, are connected via the connection conductor, a conductor width of the connection conductor is smaller than a conductor width of the first coil conductor, and a conductor width of the second coil conductor is smaller than the conductor width of the first coil conductor.

According to the present disclosure, it is possible to provide a multilayer coil component in which a crack is less likely to occur in the periphery of a connection conductor that connects coil conductors.

DETAILED DESCRIPTION

Hereinafter, a multilayer coil component of the present disclosure will be described.

The present disclosure is not limited to the following configurations and aspects, and can be appropriately modified and applied without departing from the gist of the present disclosure. Note that the present disclosure also includes a combination of two or more of the individual desirable configurations and aspects of the present disclosure to be described below.

Figure 1:
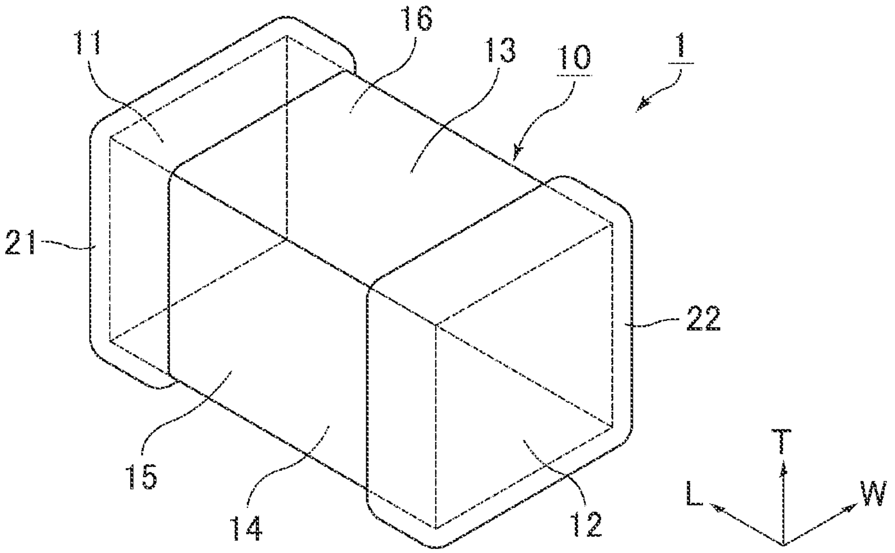
FIG. 1 is a perspective view of a multilayer coil component of the present disclosure schematically illustrating an example thereof.
Figure 2:
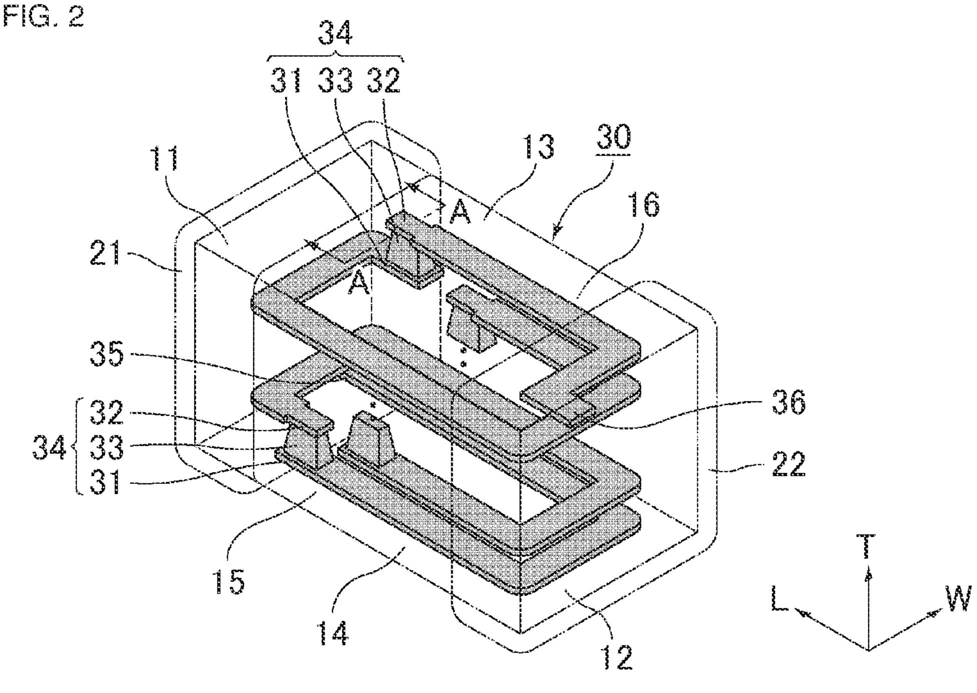
FIG. 2 is a schematic view of the multilayer coil component of the present disclosure as seen through to show the inside thereof to illustrate the structure of the coil.

FIG. 1 is a perspective view of the multilayer coil component of the present disclosure schematically illustrating an example thereof. FIG. 2 is a schematic view of the multilayer coil component of the present disclosure as seen through to show the inside thereof to illustrate the structure of a coil.

A multilayer coil component 1 illustrated in FIG. 1 includes a multilayer body 10, a first outer electrode 21, and a second outer electrode 22. The multilayer body 10 has a substantially rectangular parallelepiped shape having six surfaces. Although the configuration of the multilayer body 10 will be described later, the multilayer body 10 is formed by laminating a plurality of insulation layers and includes a coil inside thereof. Each of the first outer electrode 21 and the second outer electrode 22 is electrically connected to the coil.

In the multilayer coil component and the multilayer body described in the present description, a direction in which the first outer electrode and the second outer electrode oppose to each other is defined as a length direction. A direction orthogonal to the length direction is defined as a height direction, and a direction orthogonal to the length direction and the height direction is defined as a width direction.

In FIG. 1 and FIG. 2, the length direction, the width direction, and the height direction of the multilayer coil component and the multilayer body are indicated as an L-direction, a W-direction, and a T-direction by arrows, respectively. The length direction (L-direction), the width direction (W-direction), and the height direction (T-direction) are orthogonal to each other. A mounting surface of the multilayer coil component 1 is a surface (LW-plane) parallel to the length direction and the width direction.

The multilayer body 10 illustrated in FIG. 1 and FIG. 2 has a first end surface 11 and a second end surface 12 opposing to each other in the length direction, a first main surface 13 and a second main surface 14 opposing to each other in the height direction orthogonal to the length direction, and a first side surface 15 and a second side surface 16 opposing to each other in the width direction orthogonal to the length direction and the height direction.

Although not illustrated in FIG. 1 and FIG. 2, the multilayer body 10 is preferably rounded at its corner portion and ridge portion. The corner portion is a portion where three surfaces of the multilayer body meet, and the ridge portion is a portion where two surfaces of the multilayer body meet.

As illustrated in FIG. 1, the first outer electrode 21 is disposed to cover the first end surface 11 of the multilayer body 10, and extends from the first end surface 11 to cover part of the first main surface 13, part of the second main surface 14, part of the first side surface 15, and part of the second side surface 16. Further, as illustrated in FIG. 1, the second outer electrode 22 is disposed to cover the second end surface 12 of the multilayer body 10, and extends from the second end surface 12 to cover part of the first main surface 13, part of the second main surface 14, part of the first side surface 15, and part of the second side surface 16. The second main surface 14 serves as a mounting surface.

The coil is formed by electrically connecting a plurality of coil conductors laminated together with the insulation layers. A lamination direction of the multilayer body, being a direction in which the plurality of insulation layers is laminated, extends along the height direction. Further, a coil axis of the coil extends along the height direction.

Furthermore, it is preferable that the coil conductor and the first outer electrode be electrically connected to each other on the first end surface, and the coil conductor and the second outer electrode be electrically connected to each other on the second end surface. A state is illustrated in FIG. 2 in which the coil conductor constituting a coil 30 and the first outer electrode 21 are electrically connected to each other on the first end surface 11, and the coil conductor and the second outer electrode 22 are electrically connected to each other on the second end surface 12. A conductor that extends the coil 30 to the first end surface 11 is an extended conductor 35, and a conductor that extends the coil 30 to the second end surface 12 is an extended conductor 36. A connection position of the coil conductor and the outer electrode can be altered by changing a position at which the coil conductor is extended to the outside of the multilayer body. The coil conductor and the outer electrode may be electrically connected to each other on the main surface or the side surface of the multilayer body by changing the extending position.

FIG. 2 illustrates that adjacent coil conductors are connected to each other via a connection conductor. The adjacent coil conductors connected via a connection conductor 33 are a first coil conductor 31 and a second coil conductor 32. A portion at which the first coil conductor 31 and the second coil conductor 32, being coil conductors adjacent to each other, are connected via the connection conductor 33 is referred to as a connection portion 34. In other words, the connection portion is a portion configured of a portion of the first coil conductor in contact with the connection conductor, a portion of the second coil conductor in contact with the connection conductor, and the connection conductor.

In the multilayer coil component 1, in the connection portion 34, a conductor width of the connection conductor 33 is smaller than a conductor width of the first coil conductor 31, and a conductor width of the second coil conductor 32 is smaller than the conductor width of the first coil conductor 31. In the multilayer coil component 1 illustrated in FIG. 2, in the connection portion 34 in the upper rear of the drawing, the coil conductor positioned on the lower side in the height direction is the first coil conductor 31, and the coil conductor positioned on the upper side in the height direction is the second coil conductor 32. Also, in the connection portion 34 in the lower front of the drawing, the coil conductor positioned on the lower side in the height direction is the first coil conductor 31, and the coil conductor positioned on the upper side in the height direction is the second coil conductor 32.

In the connection portion 34, one coil conductor connected via the connection conductor 33 is the first coil conductor 31, and the other coil conductor is the second coil conductor 32. When three of the conductor width of the connection conductor, the conductor width of the one coil conductor, and the conductor width of the other coil conductor are compared, the coil conductor having a large conductor width is the first coil conductor, and the coil conductor having a small conductor width is the second coil conductor. Then, the conductor width of the first coil conductor is larger than the conductor width of the connection conductor. In the connection portion 34 in FIG. 2, the first coil conductor 31 is positioned on the lower side and the second coil conductor 32 is positioned on the upper side, but whether it is the first coil conductor or the second coil conductor is determined by the conductor width, and is not determined by whether it is positioned on the upper side or the lower side in the height direction (lamination direction).

Hereinafter, a form of the connection portion will be described in detail.

Figure 3:
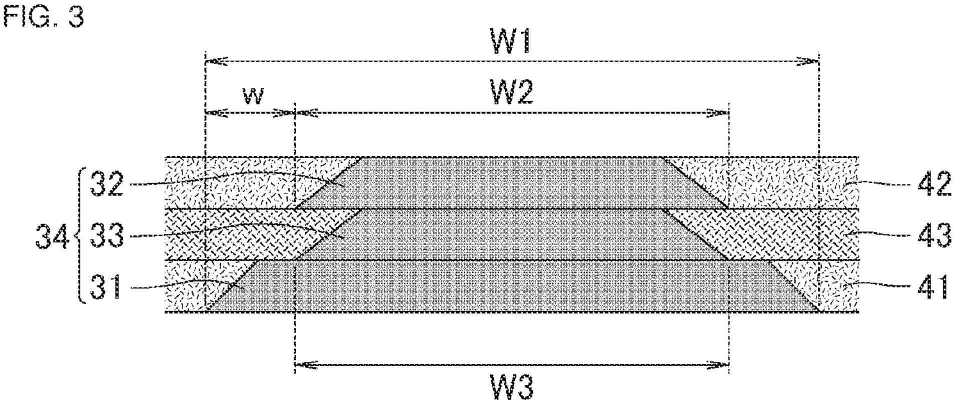
FIG. 3 is a sectional view of a connection portion taken along a line A-A in FIG. 2, schematically illustrating details thereof.

FIG. 3 is a sectional view of a connection portion taken along a line A-A in FIG. 2, schematically illustrating a detail thereof. FIG. 3 illustrates the first coil conductor 31, the second coil conductor 32, and the connection conductor 33 that constitute the connection portion 34. The conductor width of the first coil conductor 31 is indicated by a double-headed arrow W1, the conductor width of the second coil conductor 32 is indicated by a double-headed arrow W2, and the conductor width of the connection conductor 33 is indicated by a double-headed arrow W3.

When each of the first coil conductor 31, the second coil conductor 32, and the connection conductor 33 is a conductor having a tapered end portion in its sectional shape, the conductor width thereof is determined by a width at which the conductor width is the largest.

In the connection portion 34, the conductor width of the connection conductor 33 is smaller than the conductor width of the first coil conductor 31, and the conductor width of the second coil conductor 32 is smaller than the conductor width of the first coil conductor 31. This means that $W3<W1$ and $W2<W1$ is satisfied in FIG. 3. In the connection portion 34 in FIG. 3, the conductor width W3 of the connection conductor 33 and the conductor width W2 of the second coil conductor 32 are the same, but the conductor width W3 of the connection conductor 33 and the conductor width W2 of the second coil conductor 32 may be different from each other.

When a conductor width of a coil conductor and a conductor width of a connection conductor in a connection portion satisfy the above-described relationship, the following effects occur. Stress is generated in an insulation layer made of an insulative material such as ferrite by heat treatment when a multilayer coil component is processed. This is because the coefficient of linear expansion of a metal such as silver constituting the conductor portion and that of the insulative material such as ferrite are different from each other. When a conductor contracts, particularly in a temperature decreasing process in which temperature changes from high to low, tensile stress is generated in the insulation layer. Then, the larger a displacement amount of the conductor is, the larger the tensile stress becomes. In the case above, when the tensile stress becomes larger than the strength of the insulation layer, a crack occurs in the insulation layer. Accordingly, by adopting a structure in which each of a conductor width of one coil conductor (second coil conductor) and a conductor width of the connection conductor is smaller than a conductor width of the other coil conductor (first coil conductor), the displacement amount of the conductor is reduced. This makes the tensile stress generated in the insulation layer be reduced, and thus the occurrence of a crack may be prevented.

In the connection portion, the conductor width of the first coil conductor is preferably 180 μm or more and 380 μm or less (i.e., from 180 μm to 380 μm). Further, the conductor width of the first coil conductor at a portion other than the connection portion is preferably the same as the conductor width at the connection portion, and is preferably 180 μm or more and 380 μm or less (i.e., from 180 μm to 380 μm).

In the connection portion, the conductor width of the second coil conductor is preferably smaller than the conductor width of the first coil conductor, and the conductor width of the second coil conductor is preferably 30% or more and 90% or less (i.e., from 30% to 90%) of the conductor width of the first coil conductor. When the conductor width of the second coil conductor is intended to be smaller than the conductor width of the first coil conductor, in consideration of manufacturing tolerance and the like, the conductor width of the second coil conductor is preferably set to 90% or less of the conductor width of the first coil conductor. Further, when the conductor width of the second coil conductor is smaller than 30% of the conductor width of the first coil conductor, the conductor width of the second coil conductor is too small, and there is a possibility that disconnection occurs in the second coil conductor. Furthermore, it is preferable that a difference between the conductor width of the second coil conductor and the conductor width of the first coil conductor be 40 μm or more and 200 μm or less (i.e., from 40 μm to 200 μm). From the view points above, the conductor width of the second coil conductor is preferably 55 μm or more and 340 μm or less (i.e., from 55 μm to 340 μm).

Further, the conductor width of the second coil conductor at a portion other than the connection portion is preferably greater than the conductor width of the second coil conductor at the connection portion, and is preferably 180 μm or more and 380 μm or less (i.e., from 180 μm to 380 μm). At a portion other than the connection portion, the conductor width of the first coil conductor and the conductor width of the second coil conductor may be the same, and the conductor width of the second coil conductor may be larger than the conductor width of the first coil conductor.

A conductor thickness of the first coil conductor is preferably 20 μm or more at the connection portion. Further, a conductor thickness of the second coil conductor is preferably 20 μm or more at the connection portion. When a conductor thickness of the coil conductor is 20 μm or more, that is large, a crack tends to occur in the connection portion. However, in the multilayer coil component of the present disclosure, since the widths of the coil conductor and the connection conductor in the connection portion are set to have a predetermined relationship, it is possible to prevent the occurrence of a crack in the connection portion even when the thickness of the coil conductor is large.

In the connection portion, the conductor width of the connection conductor is preferably smaller than the conductor width of the first coil conductor, and the conductor width of the connection conductor is preferably 30% or more and 90% or less (i.e., from 30% to 90%) of the conductor width of the first coil conductor. When the conductor width of the connection conductor is intended to be smaller than the conductor width of the first coil conductor, in consideration of manufacturing tolerance and the like, the conductor width of the connection conductor is preferably set to 90% or less of the conductor width of the first coil conductor. Further, when the conductor width of the connection conductor is smaller than 30% of the conductor width of the first coil conductor, the conductor width of the connection conductor is too small, and there is a possibility that disconnection occurs in the connection conductor. It is preferable that a difference between the conductor width of the connection conductor and the conductor width of the first coil conductor be 40 μm or more and 200 μm or less (i.e., from 40 μm to 200 μm). From the viewpoints above, the conductor width of the connection conductor is preferably 55 μm or more and 340 μm or less (i.e., from 55 μm to 340 μm).

In FIG. 3, a protrusion width of the first coil conductor 31 with respect to the second coil conductor 32 and the connection conductor 33 is indicated by a double-headed arrow w. Normally, the first coil conductor 31 protrudes from both left and right sides of the second coil conductor 32 and the connection conductor 33. In the form above, preferable relationships between the width of the first coil conductor and the protrusion width w are as follows, for example. When the width of the first coil conductor is 200 μm or more and less than 300 μm (i.e., from 200 μm to 300 μm), the protrusion width is 20 μm or more and 80 μm or less (i.e., from 20 μm to 80 μm). When the width of the first coil conductor is 300 μm or more and less than 400 μm (i.e., from 300 μm to 400 μm), the protrusion width is 40 μm or more and 100 μm or less (i.e., from 40 μm to 100 μm).

The first coil conductor, the second coil conductor, and the connection conductor each preferably contain metal, preferably contain copper, silver, or the like, and more preferably contain silver.

As a material of the insulation layer, a magnetic material or a non-magnetic material may be used. A magnetic ferrite material may be used as the magnetic material. There may preferably be used a magnetic ferrite material composed of Fe of 40 mol % or more and 49.5 mol % or less (i.e., from 40 mol % to 49.5 mol %) in terms of $Fe_2O_3$, Zn of 5 mol % or more and 35 mol % or less (i.e., from 5 mol % to 35 mol %) in terms of ZnO, Cu of 4 mol % or more and 12 mol % or less (i.e., from 4 mol % to 12 mol %) in terms of CuO, and NiO for the rest. Trace additives (including inevitable impurities) such as Mn, Co, Sn, Bi, and Si may be contained in the above-described magnetic ferrite material.

A non-magnetic ferrite material may be used as the non-magnetic material. There may preferably be used a non-magnetic ferrite material composed of Fe of 40 mol % or more and 49.5 mol % or less (i.e., from 40 mol % to 49.5 mol %) in terms of $Fe_2O_3$, Cu of 4 mol % or more and 12 mol % or less (i.e., from 4 mol % to 12 mol %) in terms of CuO, and ZnO for the rest. Trace additives (including inevitable impurities) such as Mn, Co, Sn, Bi, and Si may be contained in the above-described non-magnetic ferrite material.

Examples of the insulation layer include an insulation layer positioned at the same height as the first coil conductor, an insulation layer positioned at the same height as the second coil conductor, and an insulation layer positioned at the same height as the connection conductor. Further, the insulation layer positioned at the same height as the connection conductor includes an insulation layer positioned between the first coil conductor and the second coil conductor, and an insulation layer in the periphery of the insulation layer positioned between the first coil conductor and the second coil conductor. Among the insulation layers above, the insulation layer positioned between the first coil conductor and the second coil conductor is preferably made of a non-magnetic material. When the insulation layer positioned between the first coil conductor and the second coil conductor is made of a non-magnetic material, magnetic saturation is less likely to occur, and the direct current superposed characteristics of the multilayer coil component may be improved.

Further, the insulation layer positioned at the same height as the first coil conductor and the insulation layer positioned at the same height as the second coil conductor are preferably made of a magnetic material. FIG. 3 illustrates an insulation layer 41 positioned at the same height as the first coil conductor and an insulation layer 42 positioned at the same height as the second coil conductor. These insulation layers 41 and 42 each are preferably an insulation layer made of a magnetic material. FIG. 3 also illustrates an insulation layer 43 positioned between the first coil conductor and the second coil conductor. The insulation layer 43 is preferably an insulation layer made of a non-magnetic material.

Further, of the insulation layers positioned at the same height as the connection conductor, the insulation layer, in the periphery of the insulation layer positioned between the first coil conductor and the second coil conductor, is preferably made of a magnetic material. The insulation layer above is the insulation layer denoted by a reference sign 44 in FIG. 5 to be described later.

In the multilayer coil component of the present disclosure, it is possible to prevent the occurrence of a crack in an insulation layer in the periphery of a connection portion, when there is a large difference between the coefficient of linear expansion of a metal material constituting a coil conductor or a connection conductor and the coefficient of linear expansion of an insulative material such as ferrite constituting the insulation layer. When the metal material constituting the coil conductor and the connection conductor is silver and the material constituting the insulation layers is ferrite, the difference in the coefficient of linear expansion is preferably 11 ppm/K or more and 29 ppm/K or less (i.e., from 11 ppm/K to 29 ppm/K).

In FIG. 3, an example is illustrated in which the conductor width W3 of the connection conductor 33 and the conductor width W2 of the second coil conductor 32 are the same (W2=W3) at the connection portion 34, but in the multilayer coil component of the present disclosure, the conductor width of the second coil conductor is preferably smaller than the conductor width of the connection conductor at the connection portion.

Figure 4:
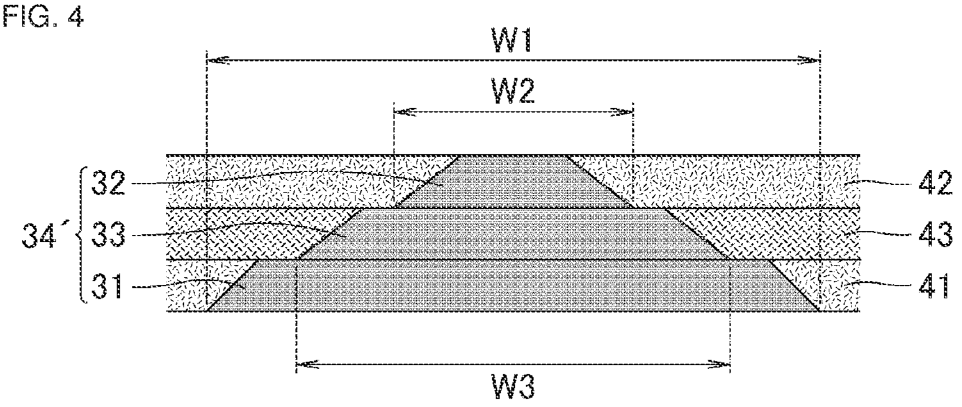
FIG. 4 is a sectional view of a connection portion schematically illustrating another example.

FIG. 4 is a sectional view of a connection portion schematically illustrating another example. At a connection portion 34' in FIG. 4, as same as the connection portion 34 in FIG. 3, the conductor width of the connection conductor 33 is smaller than the conductor width of the first coil conductor 31, and the conductor width of the second coil conductor 32 is smaller than the conductor width of the first coil conductor 31. This means that W3<W1 and W2<W1 is satisfied in FIG. 4. Furthermore, in the connection portion 34' in FIG. 4, the conductor width W2 of the second coil conductor 32 is smaller than the conductor width W3 of the connection conductor 33. That is, W2<W3 is satisfied. In the case above, there may be obtained a structure in which a crack is least likely to occur.

Then, an example of a method for manufacturing the multilayer coil component of the present disclosure will be described. Hereinafter, a method for producing a multilayer body by a printing lamination method will be described. The printing lamination method is a method of forming a coil conductor extending in a lamination direction of a multilayer body by applying and laminating a conductive paste and a ceramic paste. This method is different from a method in which, by making holes in a sheet with laser drilling and filling the holes with a conductive paste, a sheet provided with via conductors therein is produced, and the plurality of sheets is laminated.

Figure 5:
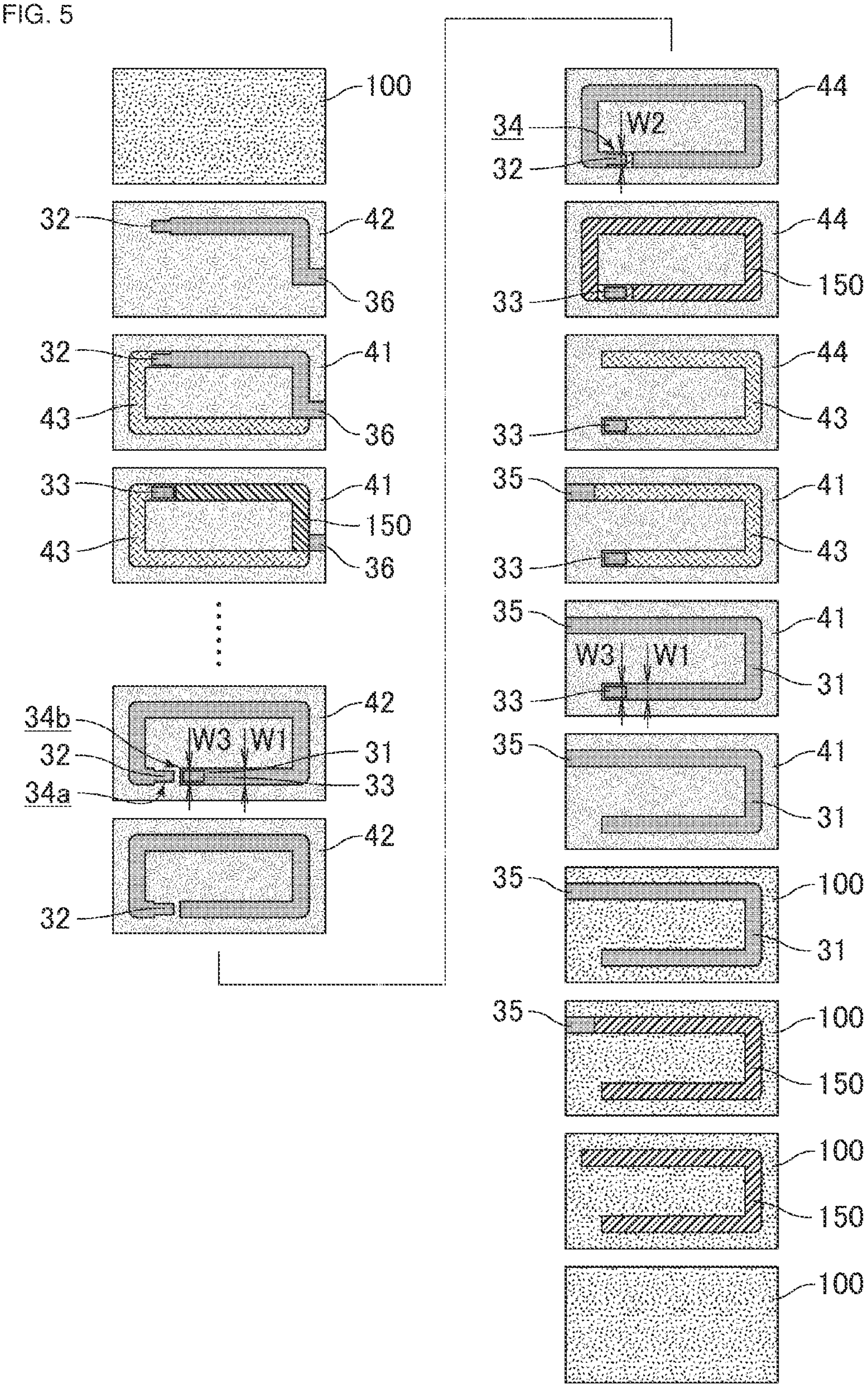
FIG. 5 is an exploded view schematically illustrating a method for producing a multilayer body by a printing lamination method.

FIG. 5 is an exploded view schematically illustrating a method for producing a multilayer body by a printing lamination method. FIG. 5 illustrates a layer structure constituting a multilayer body produced by the printing lamination method. In the printing lamination method, an outer layer 100, which is an insulation layer illustrated at the bottom of FIG. 5, is used as a base, and a resin paste, a conductive paste and a ceramic paste, each of which constitutes a layer, are applied serially. The ceramic paste is a material that becomes an insulation layer by firing. Each layer illustrated in FIG. 5 shows an upper surface state after application, and each layer illustrated in FIG. 5 is not separately produced and laminated.

First, a ceramic paste, a conductive paste, and a resin paste as materials are prepared. As the ceramic paste, a magnetic ferrite paste and a non-magnetic ferrite paste are preferably used. As the magnetic ferrite paste, it is preferable to use a magnetic ferrite material composed of Fe of 40 mol % or more and 49.5 mol % or less (i.e., from 40 mol % to 49.5 mol %) in terms of $Fe_2O_3$, Zn of 5 mol % or more and 35 mol % or less (i.e., from 5 mol % to 35 mol %) in terms of ZnO, Cu of 4 mol % or more and 12 mol % or less (i.e., from 4 mol % to 12 mol %) in terms of CuO, and NiO for the rest. Trace additives (including inevitable impurities) such as Mn, Co, Sn, Bi, and Si may be contained in the above-described magnetic ferrite material. As the non-magnetic ferrite paste, it is preferable to use a non-magnetic ferrite material composed of Fe of 40 mol % or more and 49.5 mol % or less (i.e., from 40 mol % to 49.5 mol %) in terms of $Fe_2O_3$, Cu of 4 mol % or more and 12 mol % or less (i.e., from 4 mol % to 12 mol %) in terms of CuO, and ZnO for the rest. Trace additives (including inevitable impurities) such as Mn, Co, Sn, Bi, and Si may be contained in the above-described non-magnetic ferrite material.

Examples of the method for producing the ceramic paste include the following method. A magnetic ferrite material or a non-magnetic ferrite material, and additives as necessary are weighed so as to have a predetermined composition, are put into a ball-mill, are wet-mixed and pulverized, discharged, evaporated and dried, and then calcined at a temperature of 700° C. or higher and 800° C. or lower to obtain a calcined powder. Predetermined amounts of a solvent (such as a ketone-based solvent), resin (such as polyvinyl acetal), and a plasticizer (such as an alkyd-based plasticizer)

are added to the calcined powder, kneaded with a planetary mixer, and further dispersed with a three-roll mill to produce a ceramic paste.

As the conductive paste, a paste containing silver as a conductive material is preferably used. Examples of the method for producing the conductive paste include the following method. Silver powder is prepared, predetermined amounts of a solvent (such as eugenol), resin (such as ethyl cellulose), and a dispersant are added, and the mixture is kneaded with a planetary mixer and then dispersed with a three-roll mill to produce a conductive paste.

The resin paste is a paste for forming a resin layer between the ceramic paste and the conductive paste, and a gap is formed by burning out the resin layer after firing. Examples of the method for producing the resin paste include the following method. By making a solvent (such as dihydroterpinyl acetate or isophorone) contain resin (such as an acrylic resin) that is burned out at the time of firing, a resin paste is produced.

Since the printing lamination proceeds from the lower right to the upper right, and further, from the lower left to the upper left in the drawing, description will be made along the procedure. First, a thermal release sheet and a base film are laminated on a metal plate, and a magnetic ferrite paste is applied the predetermined number of times to prepare an outer layer. As the base film, a PET (polyethylene terephthalate) film may suitably be used. The outer layer 100 is illustrated at the bottom of the right column in FIG. 5.

Next, a resin layer 150 is formed by applying a resin paste on the outer layer 100 so as to become a pattern illustrated at a second position from the bottom of the right column in FIG. 5. It is preferable that the pattern of the resin layer 150 be substantially the same as a pattern of the first coil conductor 31 to be formed later, and a line width of the resin layer 150 be slightly smaller than the conductor width of the first coil conductor 31.

Next, a conductive paste is applied on a portion to be the extended conductor 35, so as to form a pattern illustrated at a third position from the bottom of the right column in FIG. 5. Next, the first coil conductor 31 is formed by applying a conductive paste to cover the resin layer 150, so as to form a pattern illustrated at a fourth position from the bottom of the right column in FIG. 5. With the procedure above, the thickness of the extended conductor may be increased. By increasing the thickness of the extended conductor, the sealing property of a multilayer coil component may be improved.

Next, the insulation layer 41 is formed by applying a magnetic ferrite paste on a region where neither the extended conductor 35 nor the first coil conductor 31 is formed. The thickness of the insulation layer 41 is made substantially the same as the thickness of the extended conductor 35 and the first coil conductor 31 so that the surface formed by the insulation layer 41, the extended conductor 35, and the first coil conductor 31 is made substantially flat. The pattern illustrated at a fifth position from the bottom of the right column in FIG. 5 shows the upper surface after the insulation layer 41 is formed.

Then, the conductive paste to be the connection conductor 33 is applied on the first coil conductor 31 so as to form a pattern illustrated at a sixth position from the bottom of the right column in FIG. 5. The connection conductor 33 is formed such that the conductor width W3 of the connection conductor 33 is smaller than the conductor width W1 of the first coil conductor 31.

Then, the insulation layer 43 is formed by applying a non-magnetic ferrite paste on the first coil conductor 31 so as to form a pattern illustrated at a seventh position from the bottom of the right column in FIG. 5. The connection conductor 33 is exposed on the upper surface. The insulation layer 43 is not formed on the extended conductor 35.

Next, a magnetic ferrite paste is applied in the periphery of the insulation layer 43 to form the insulation layer 44. A surface formed by the insulation layer 43, the insulation layer 44, and the connection conductor 33 is made substantially flat. The pattern illustrated at an eighth position from the bottom of the right column in FIG. 5 shows the upper surface after the insulation layer 44 is formed.

Then, the resin layer 150 is formed by applying a resin paste so as to form a pattern illustrated at a ninth position from the bottom of the right column in FIG. 5. It is preferable that the pattern of the resin layer 150 be substantially the same as a pattern of the second coil conductor 32 to be formed later, and a line width of the resin layer 150 be slightly smaller than the conductor width of the second coil conductor 32. The conductor width of the second coil conductor 32 referred to herein means a conductor width at a portion other than the connection portion to be connected to the connection conductor 33. Further, the resin layer 150 is formed so as not to cover the upper surface and the periphery of the connection conductor 33.

Then, the second coil conductor 32 is formed, by applying a conductive paste to cover the resin layer 150, so as to form a pattern illustrated at a tenth position from the bottom of the right column in FIG. 5. The connection portion 34 is formed by the second coil conductor 32 being in contact with the connection conductor 33. The second coil conductor 32 is formed such that the conductor width W2 of the second coil conductor 32 is smaller than the conductor width W1 of the first coil conductor 31 at the connection portion 34. Further, the conductor width W2 of the second coil conductor 32 may be the same as the conductor width W3 of the connection conductor 33, or the conductor width W2 of the second coil conductor 32 may be smaller than the conductor width W3 of the connection conductor 33.

Next, the insulation layer 42 is formed by applying the magnetic ferrite paste in the periphery of the second coil conductor 32 so as to form a pattern illustrated at the bottom of the left column in FIG. 5. The insulation layer 42 is also formed in a portion of the connection portion 34 where the insulation layer 43 is exposed. As a result, the surface formed by the insulation layer 42 and the second coil conductor 32 is made substantially flat.

Then, the conductive paste to be the connection conductor 33 is applied on the coil conductor described so far as the second coil conductor 32, so as to become a pattern illustrated at a second position from the bottom of the left column in FIG. 5. The connection conductor 33 is formed at a position advanced by one turn of the coil from the connection portion 34 (connection portion 34*a*) connected to the first coil conductor 31 in a lower layer. At a portion where the connection conductor 33 is formed, the conductor width W3 of the connection conductor 33 is smaller than the conductor width W1 of the coil conductor described so far as the second coil conductor 32. That is, at this portion, the coil conductor, described so far as the second coil conductor 32, becomes the first coil conductor 31. Whether the coil conductor is the first coil conductor or the second coil conductor is determined based on a relationship between the conductor width of the coil conductor and the conductor width of the other coil conductor connected at the connection portion. Accordingly, it can be said that the coil conductor, shown by the pattern at the second bottom of the left column in FIG. 5, is the second coil conductor 32 in the left side connection portion 34*a* connected to a coil conductor in a lower layer, and is the first coil conductor 31 in a right side connection portion 34*b* connected to a coil conductor in an upper layer.

Hereinafter, formation of the insulation layer 43, formation of the insulation layer 44, formation of the resin layer 150, formation of the second coil conductor 32, formation of the insulation layer 42, and formation of the connection conductor 33 are repeatedly performed to produce a multilayer body.

In the final stage of the production of a multilayer body, the conductive paste is applied on a portion to be the extended conductor 36 so as to form a pattern illustrated at a third position from the bottom of the left column in FIG. 5. Furthermore, the second coil conductor 32 is formed, by applying a conductive paste to cover the resin layer 150, so as to form a pattern illustrated at a fourth position from the bottom of the left column in FIG. 5.

Then, an insulation layer 42 is formed, by applying a magnetic ferrite paste on a region where neither the extended conductor 36 nor the second coil conductor 32 is formed, so as to form a pattern illustrated at a fifth position from the bottom of the left column in FIG. 5. The thickness of the insulation layer 42 is made substantially the same as the thickness of the extended conductor 36 and the second coil conductor 32 so that the surface formed by the insulation layer 42, the extended conductor 36, and the second coil conductor 32 is made substantially flat. Finally, as illustrated at a sixth position from the bottom of the left column in FIG. 5, the outer layer 100 is formed, by applying a ceramic paste the predetermined number of times so as to cover the entirety of the extended conductor 36 and the second coil conductor 32.

Next, layers are pressure-bonded while being attached to the metal plate. Subsequently, cooling is performed, and the metal plate and the base film are peeled off in this order, whereby an aggregated body (multilayer body block) in which a large number of elements having the above-described pattern are provided on one surface is obtained.

The multilayer body block is cut by a dicer or the like to be singulated into elements. This element corresponds to one multilayer coil component. The obtained element is subjected to barrel treatment, whereby corners of the element are cut and rounded. The barrel treatment may be performed on an unfired element or may be performed on a multilayer body after firing. Further, the barrel treatment may be either dry or wet. The barrel treatment may be a method of co-rubbing elements or a method of barrel treatment together with a medium.

After the barrel treatment, the element is fired at a temperature of 910° C. or higher and 930° C. or lower to obtain a multilayer body. By firing the element, the resin layer is burned out, and a gap portion is formed between an insulation layer and a coil conductor.

After the firing, a paste containing a metal is applied to the multilayer body and baked to form a base electrode. Next, electrolytic plating is performed to sequentially form a Ni-coating and a Sn-coating on the base electrode, thereby forming a first outer electrode and a second outer electrode, and thus a multilayer coil component can be obtained.

Examples

Hereinafter, examples of the multilayer coil component according to the present disclosure will be described in more detail. Note that the present disclosure is not limited to these examples.

<Preparation of Magnetic Ferrite Paste>

$Fe_2O_3$, ZnO, CuO, NiO, and additive components were weighed so as to have a predetermined composition, wet-mixed, and pulverized. The pulverized material was dried and calcined at a temperature of 700° C. or more and 800° C. or less (i.e., from 700° C. to 800° C.) to obtain a calcined powder. Predetermined amounts of a solvent (such as a ketone-based solvent), resin (such as polyvinyl acetal), and a plasticizer (such as an alkyd-based plasticizer) were added to the calcined powder, kneaded with a planetary mixer, and further dispersed with a three-roll mill to produce a magnetic ferrite paste.

<Preparation of Non-Magnetic Ferrite Paste>

$Fe_2O_3$, ZnO, CuO, and additive components were weighed so as to have a predetermined composition, wet-mixed, and pulverized. The pulverized material was dried and calcined at a temperature of 700° C. or more and 800° C. or less (i.e., from 700° C. to 800° C.) to obtain a calcined powder. Predetermined amounts of a solvent (such as a ketone-based solvent), resin (such as polyvinyl acetal), and a plasticizer (such as an alkyd-based plasticizer) were added to the calcined powder, kneaded with a planetary mixer, and further dispersed with a three-roll mill to produce a non-magnetic ferrite paste.

<Preparation of Conductive Paste>

Silver powder was prepared, predetermined amounts of a solvent (such as eugenol), resin (such as ethyl cellulose), and a dispersant were added, and the mixture was kneaded with a planetary mixer and then dispersed with a three-roll mill to prepare a conductive paste.

<Preparation of Resin Paste>

By making a solvent (dihydroterpinyl acetate) contain an acrylic resin, a resin paste was prepared.

<Production of Multilayer Body>

According to the procedure illustrated in FIG. 5, a multilayer body was produced using the printing lamination method. Here, as a result of trial production of a multilayer coil component in which a conductor width of a connection conductor is set to be larger than conductor widths of adjacent coil conductors in a connection portion, it was found that a crack occurs in the periphery of the connection conductor that connects the coil conductors. As an example, when the conductor width W1 of a first coil conductor was 265 μm, the conductor width W3 of a connection conductor was 306 and the conductor width W2 of a second coil conductor was 265 μm, the crack occurrence rate was 100%. Whereas, when the conductor width W1 of a first coil conductor was 264 μm, the conductor width W3 of a connection conductor was 183 and the conductor width W2 of a second coil conductor was 183 μm, the crack occurrence rate was 0%. In the case above, the conductor width W2 of the second coil conductor and the conductor width W3 of the connection conductor each were 69% of the conductor width W1 of the first coil conductor.

When the conductor width W1 of a first coil conductor was fixed at 265 μm and the conductor width W2 of a second coil conductor and the conductor width W3 of a connection conductor were changed as follows, following crack occurrence rates were obtained.

W2 and W3=225 μm (85% of conductor width W1): crack occurrence rate 0%

W2 and W3=212 μm (80% of conductor width W1): crack occurrence rate 0%

W2 and W3=200 μm (75% of conductor width W1): crack occurrence rate 0%

W2 and W3=100 μm (38% of conductor width W1): crack occurrence rate 0%

When the conductor width W1 of a first coil conductor was fixed at 210 μm and the conductor width W2 of a second coil conductor and the conductor width W3 of a connection conductor were changed as follows, following crack occurrence rates were obtained.

W2 and W3=180 μm (86% of conductor width W1): crack occurrence rate 0%

W2 and W3=170 μm (81% of conductor width W1): crack occurrence rate 0%

W2 and W3=160 μm (76% of conductor width W1): crack occurrence rate 0%

W2 and W3=150 μm (71% of conductor width W1): crack occurrence rate 0%

The conductor width W1 of a first coil conductor was set to 180 μm, the conductor width W2 of a second coil conductor was set to 145 μm, and the conductor width W3 of a connection conductor was set to 145 μm. In the case above, the crack occurrence rate was 0%. In the case above, the conductor width W2 of the second coil conductor and the conductor width W3 of the connection conductor each were 81% of the conductor width W1 of the first coil conductor.

The conductor width W1 of a first coil conductor was set to 350 μm, the conductor width W2 of a second coil conductor was set to 210 μm, and the conductor width W3 of a connection conductor was set to 210 μm. In the case above, the crack occurrence rate was 0%. In the case above, the conductor width W2 of the second coil conductor and the conductor width W3 of the connection conductor each were 60% of the conductor width W1 of the first coil conductor.

The conductor width W1 of a first coil conductor was set to 256 μm, the conductor width W2 of a second coil conductor was set to 188 μm, and the conductor width W3 of a connection conductor was set to 212 μm. That is, the relationship W1>W3>W2 was established. In the case above, the crack occurrence rate was 0%.

The specifications and crack occurrence rates of the multilayer bodies of the 12 types of Examples and one type of Comparative Example are summarized in Table 1.

wherein the coil includes a plurality of coil conductors that are laminated together with the insulation layers and connected together via a connection conductor, each coil conductor of the plurality of coil conductors including a first end portion, a second end portion, and a middle portion, and at a connection portion at which the second end portion of a first coil conductor of the plurality of coil conductors and the first end portion of a second coil conductor of the plurality of coil conductors, being coil conductors adjacent to each other, are connected via the connection conductor, a conductor width of the connection conductor is smaller than a conductor width of the first coil conductor, and a conductor width of the first end portion of the second coil conductor is smaller than the conductor width of the second end portion of the first coil conductor.

2. The multilayer coil component according to claim 1, wherein in the connection portion, the conductor width of the connection conductor is from 30% to 90% of the conductor width of the first coil conductor.

3. The multilayer coil component according to claim 1, wherein in the connection portion, the conductor width of the second coil conductor is from 30% to 90% of the conductor width of the first coil conductor.

4. The multilayer coil component according to claim 1, wherein in the connection portion, a difference between the conductor width of the connection conductor and the conductor width of the first coil conductor is from 40 μm to 200 μm.

5. The multilayer coil component according to claim 1, wherein in the connection portion, a difference between the conductor width of the second coil conductor and the conductor width of the first coil conductor is from 40 μm to 200 μm.

TABLE 1

| | W1 (μm) | W2 (μm) | W3 (μm) | Crack Occurrence Rate (%) | W3/W1 (%) | W2/W1 (%) | W1-W3 (μm) | W1-W2 (μm) |
|---|---|---|---|---|---|---|---|---|
| Example 1 | 264 | 183 | 183 | 0 | 69 | 69 | 81 | 81 |
| Example 2 | 265 | 225 | 225 | 0 | 85 | 85 | 40 | 40 |
| Example 3 | 265 | 212 | 212 | 0 | 80 | 80 | 53 | 53 |
| Example 4 | 265 | 200 | 200 | 0 | 75 | 75 | 65 | 65 |
| Example 5 | 265 | 100 | 100 | 0 | 38 | 38 | 165 | 165 |
| Example 6 | 210 | 180 | 180 | 0 | 86 | 86 | 30 | 30 |
| Example 7 | 210 | 170 | 170 | 0 | 81 | 81 | 40 | 40 |
| Example 8 | 210 | 160 | 160 | 0 | 76 | 76 | 50 | 50 |
| Example 9 | 210 | 150 | 150 | 0 | 71 | 71 | 60 | 60 |
| Example 10 | 180 | 145 | 145 | 0 | 81 | 81 | 35 | 35 |
| Example 11 | 350 | 210 | 210 | 0 | 60 | 60 | 140 | 140 |
| Example 12 | 256 | 188 | 212 | 0 | 83 | 73 | 44 | 68 |
| Comparative Example | 265 | 265 | 306 | 100 | 115 | 100 | −41 | 0 |

What is claimed is:

1. A multilayer coil component, comprising:

a multilayer body including a plurality of insulation layers that are laminated together, and that includes a coil inside the multilayer body; and an outer electrode on an outer surface of the multilayer body and electrically connected to the coil,

6. The multilayer coil component according to claim 1, wherein in the connection portion, the conductor width of the first coil conductor is from 180 μm to 380 μm.

7. The multilayer coil component according to claim 1, wherein in the connection portion, the conductor width of the second coil conductor is smaller than the conductor width of the connection conductor.

8. The multilayer coil component according to claim 1, wherein of the insulation layers, an insulation layer between the first coil conductor and the second coil conductor includes a non-magnetic material.

9. The multilayer coil component according to claim 2, wherein in the connection portion, the conductor width of the second coil conductor is from 30% to 90% of the conductor width of the first coil conductor.

10. The multilayer coil component according to claim 2, wherein in the connection portion, a difference between the conductor width of the connection conductor and the conductor width of the first coil conductor is from 40 μm to 200 μm.

11. The multilayer coil component according to claim 3, wherein in the connection portion, a difference between the conductor width of the connection conductor and the conductor width of the first coil conductor is from 40 μm to 200 μm.

12. The multilayer coil component according to claim 2, wherein in the connection portion, a difference between the conductor width of the second coil conductor and the conductor width of the first coil conductor is from 40 μm to 200 μm.

13. The multilayer coil component according to claim 3, wherein in the connection portion, a difference between the conductor width of the second coil conductor and the conductor width of the first coil conductor is from 40 μm to 200 μm.

14. The multilayer coil component according to claim 4, wherein in the connection portion, a difference between the conductor width of the second coil conductor and the conductor width of the first coil conductor is from 40 μm to 200 μm.

15. The multilayer coil component according to claim 2, wherein in the connection portion, the conductor width of the first coil conductor is from 180 μm to 380 μm.

16. The multilayer coil component according to claim 3, wherein in the connection portion, the conductor width of the first coil conductor is from 180 μm to 380 μm.

17. The multilayer coil component according to claim 2, wherein in the connection portion, the conductor width of the second coil conductor is smaller than the conductor width of the connection conductor.

18. The multilayer coil component according to claim 3, wherein in the connection portion, the conductor width of the second coil conductor is smaller than the conductor width of the connection conductor.

19. The multilayer coil component according to claim 2, wherein of the insulation layers, an insulation layer between the first coil conductor and the second coil conductor includes a non-magnetic material.

20. The multilayer coil component according to claim 3, wherein of the insulation layers, an insulation layer between the first coil conductor and the second coil conductor includes a non-magnetic material.

* * * * *